Sept. 12, 1944. C. T. RAY 2,357,848
TRACTOR LISTER ATTACHMENT
Filed Jan. 11, 1941 4 Sheets-Sheet 1

Inventor
CHARLES T. RAY
Walter W. Burns
Attorney

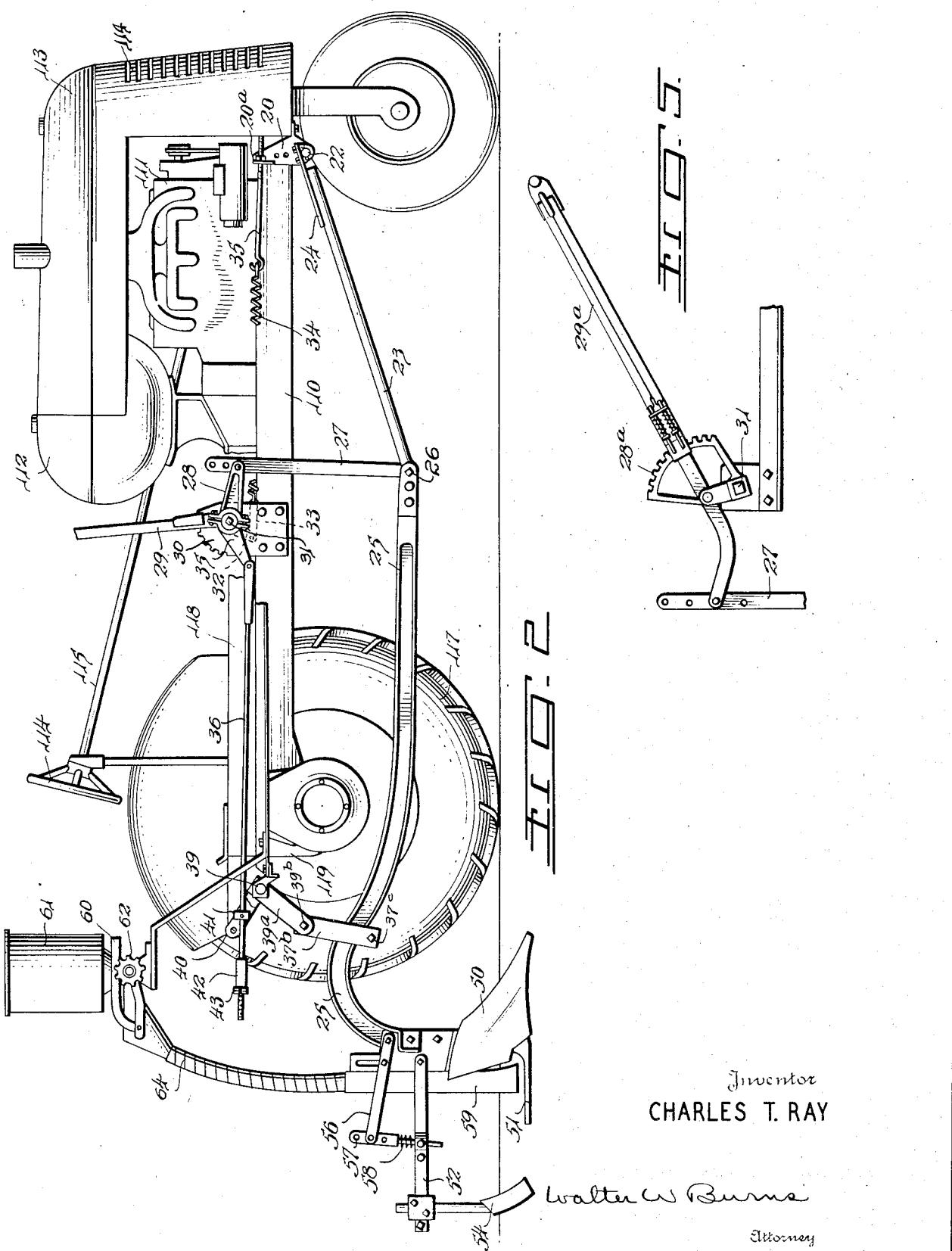

Sept. 12, 1944.  C. T. RAY  2,357,848
TRACTOR LISTER ATTACHMENT
Filed Jan. 11, 1941  4 Sheets-Sheet 3
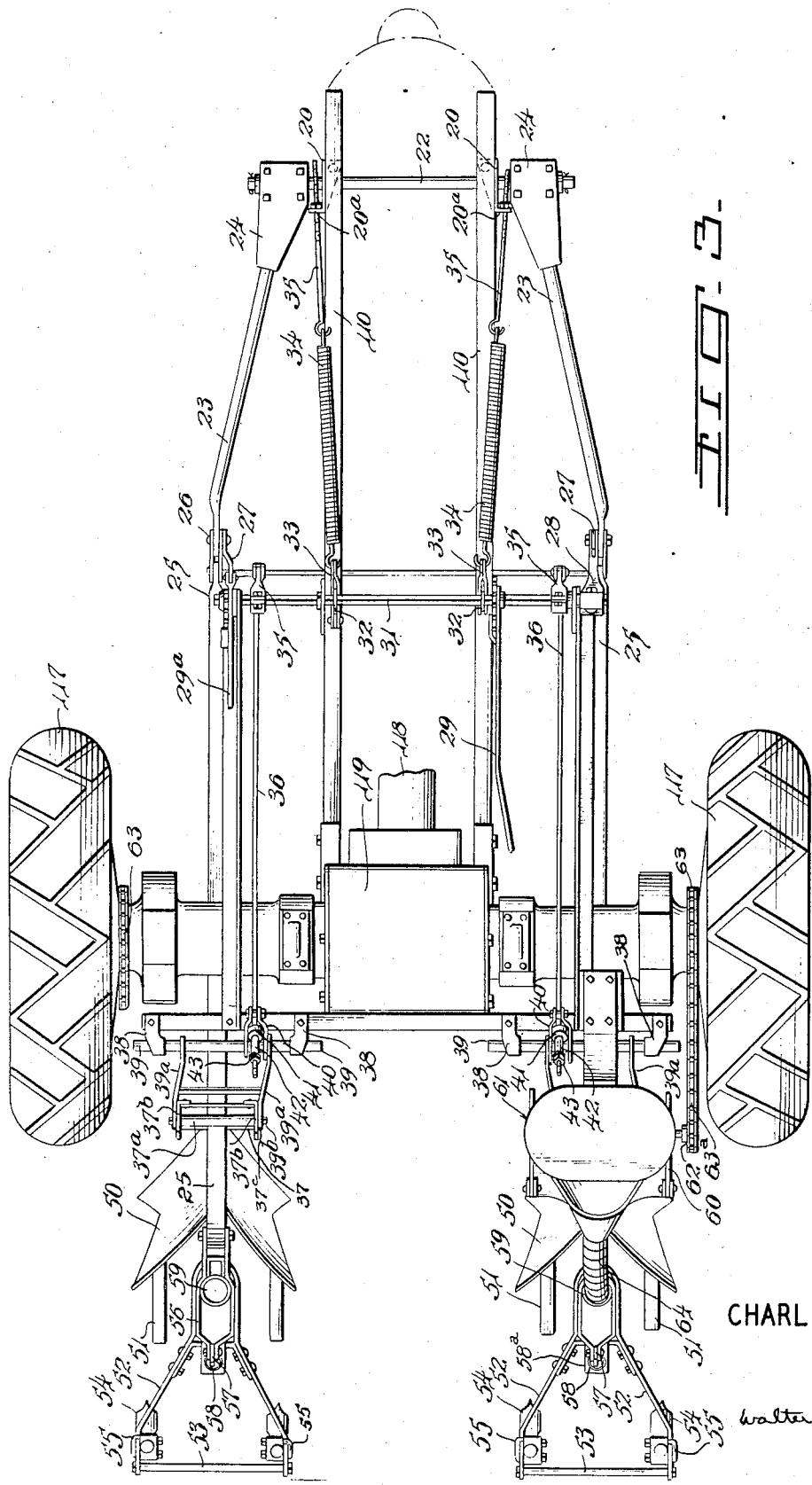
Inventor
CHARLES T. RAY
Walter W. Burns
Attorney Sept. 12, 1944.  C. T. RAY  2,357,848
TRACTOR LISTER ATTACHMENT
Filed Jan. 11, 1941  4 Sheets-Sheet 4
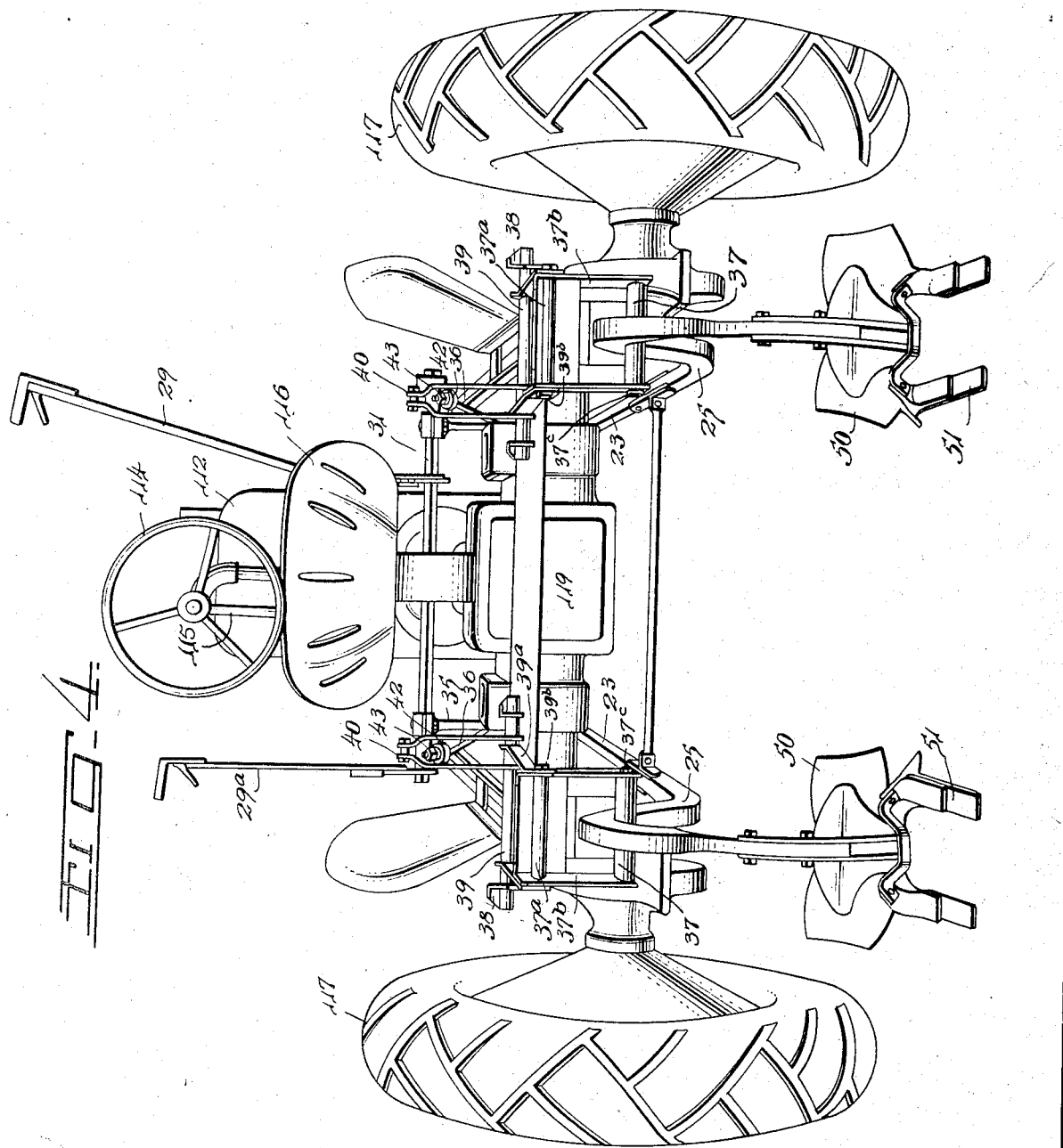
Inventor
CHARLES T. RAY
By Walter W. Burns
Attorney Patented Sept. 12, 1944

2,357,848

UNITED STATES PATENT OFFICE 2,357,848

TRACTOR LISTER ATTACHMENT

Charles T. Ray, Louisville, Ky., assignor to B. F. Avery and Sons Company, Louisville, Ky., a corporation of Delaware Application January 11, 1941, Serial No. 374,129

16 Claims. (Cl. 97—47)

This invention relates to listers and bursters and has particular relation to those implements for attachment to tractors.

When ground working implements are used as attachments for tractors, it is quite important that the ground working tools be as close as possible to the wheels of the tractor in order that complete control of the plow in its sidewise movement and that irregularities in the consistency of the earth traversed cannot throw the plow out of its predetermined path or twist due to torsional strains.

The primary object of this invention is the provision of an improved lister and burster for tractor attachment. A further object of the invention is the provision of an improved tractor lister and burster wherein the depth of entry of the plow member into the ground will be controlled by its shape and height of the forward end of the beam, while plowing, and not by any pressure either in an upward direction or downward direction applied to the plow member itself—in other words an implement which will be pulled through the ground and its depth controlled entirely by the height of the forward end of the beam.

Still another object of this invention is to provide an improved tractor lister and burster wherein readily controlled means are provided to move the forward end of the burster beam to a higher or lower position relative to the ground surface when the plow is in the ground without lifting any of the weight of the plow member or any earth in which a plow member may be embedded.

A still further object of this invention is the provision of an improved tractor lister attachment which is provided with a single means which will not only guide the forward end of the burster beam to a higher or lower position, as desired, when in the ground, but will also lift the whole plow member clear of the ground surface after it has been guided out of the ground.

A still further object of this invention is to provide an improved tractor lister attachment having means for properly guiding the entry of the plow member into the ground so that when at the proper depth, it will level off and be at the proper angle and depth with the least possible expenditure of power and with no direct up or down pressure on the rear portion of the implement from the frame.

A still further object of the invention is the provision of a tractor lister attachment having a forwardly extending beam member adjustable at its forward end at various heights during the time the plow member is in the ground, the latter being free to move up and down but being confined to movement in a substantially vertical plane.

Another and still further object of the invention is the provision of an improved tractor lister attachment having a pair of ground working members, each one of which may be placed at different relative adjustments and controlled as to depth while in the ground and having a single means operable to guide both implements to a higher or lower level while in working position and to lift both members clear of the ground after the plow members have been guided above the ground surface.

Other and further objects of the invention will be apparent, to those skilled in the art, from a reading of the complete specification and claims.

Referring to the drawings wherein is illustrated an embodiment of the invention, Fig. 1 is a side elevation of the invention with the plow members out of the ground, parts being removed for clearness in illustration.

Fig. 2 is a view similar to Fig. 1 but with the burster members in the ground.

Fig. 3 is a plan view of the invention, parts being broken away or omitted for purposes of clear illustration.

Fig. 4 is a rear perspective view of the invention with the seed hoppers and planting devices removed.

Fig. 5 is a detail view of the leveling lever 29a and its coacting parts on the left side of the machine-opposite the lifting and control lever 29.

Figure 1:
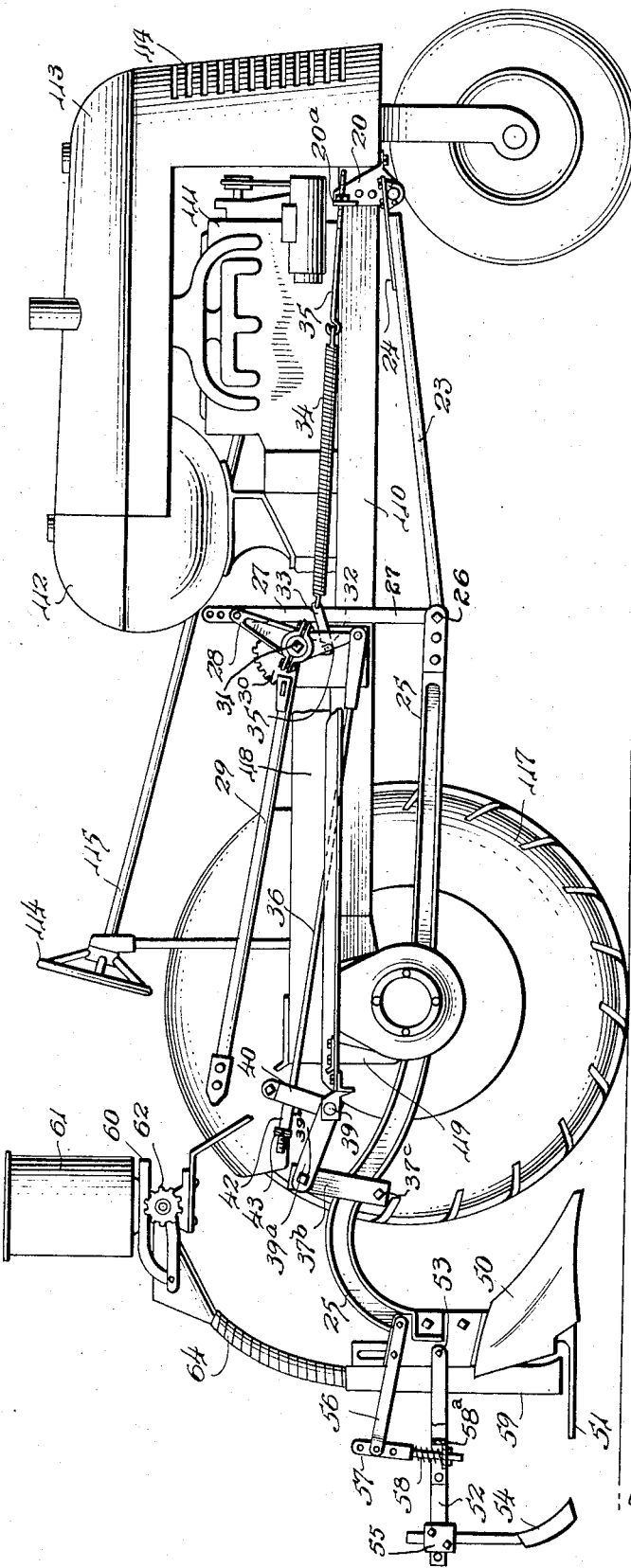

In the specification and claims where a lister is referred to, it is to be construed broadly as being with or without the seed planting device or devices.

Referring particularly to Figs. 1, 2, 3 and 4, 110 designates the frame of a tractor having an engine 111, a gasoline tank 112, a water reservoir 113 for a raditor behind the grille 114. Forward and beneath the frame 110 is a steering wheel unit which is controlled through suitable and well known worm and gear mechanism (not shown) by the steering wheel 114 and its shaft 115. On the rear portion of the frame is a seat 116 which is occupied by the operative when the tractor is in use. Rear wheels 117 are provided, which support the rear portion of the tractor and provide the traction with the ground. These wheels 117 are driven through suitable transmission mechanism from the engine 111. In Fig. 1, the rear wheel has been omitted from the showing to avoid confusion and to permit illustration of the portions of the invention located between the wheels.

Extending from the engine toward the rear of the tractor is the transmission shaft housing 118 which carries the shaft which operates the gearing in the housing 119.

The rear end construction of the illustrated tractor is of the bridge type with the bottom of the transmission gear housing above the axis of the wheels as illustrated in Fig. 4. This provides extra space for the operation of the implement as will later be made clear.

The present invention relates to listers and bursters and is designed for use with and for attachment to a tractor. Its method and means of attachment place it in the class of direct-connected implements as distinguished from those which have carrying wheels. The implement herein described has no carrying wheels and when in transport position is carried bodily by the tractor as will be later described in detail.

The burster, itself, which is described herein, is similar to the conventional walking type which latter is provided with a beam of proper length to be drawn or pulled by horses and with handles for controlling the burster. By removing the handles of the ordinary middle burster, it could be attached in a manner to be described and would work perfectly as in the present invention the main functions of the tractor during the plowing operation are (1) to pull the burster, keeping the forward end at a predetermined height and (2) keep the burster in substantially the same plane—permitting it to move upwardly and downwardly as determined by the position of the forward end and taking the torsional strains incident to any tendency to move out of the predetermined plane.

The principles upon which this instant invention operates are those of the true draft which has always been sought by the farmer with his horse pulling the implement forward and slightly upwardly against the reaction of the earth being displaced by the implement. With the farmer at the rear of the implement simply keeping it in a vertical plane, the depth of the furrow being determined by the height of the horse, the length of the traces and the adjustment of the clevis, a minimum amount of work is needed to pull the plow through the ground.

Applying these principles to the tractor-attached plow, there are bearing bracket plates 20, attached to the forward portion of the tractor frame 110. Between these bearing plates and journaled therein is a shaft 22.

Mounted on the shaft 22 is a draft bar 23 which is secured firmly to the shaft by a bracket plate 24. The draft bar 23 extends rearwardly and downwardly and at its rear end is secured the burster beam 25 as at 26. It is the height of the pivot pin 26 above the ground which controls the depth of the furrow as will be later made clear.

In order to control the height of the pivot pin 26 on the right side of the tractor at the forward end of the beam 25, there is a substantially vertical forward lifting link 27 connected at its lower end to the pivot 26 and at its upper end to an arm 28 of a lifting bell crank and control lever 29. The lifting lever 29 and the arm 28 are carried by the square shaft 31 which shaft is supported at one end on a quadrant plate 30 and at its opposite end in a corresponding plate on the opposite frame member 10. The lifting lever 29 is provided with the usual grip-controlled dog which registers with notches of the quadrant 30.

Near the end of the shaft 31 opposite to the arm 28 is a quadrant 28a which is rigid with the shaft 31. On the quadrant 28a is pivoted a leveling lever 29a which has the usual detent for coaction with the teeth of the quadrant 28a to hold the leveling lever in any one of a plurality of adjusted positions. The outer end of the lever 29a is pivoted to the upper end of the link 27 on the opposite side of the machine from the link 27 already described.

From the foregoing it is clear that an adjustment of the lever 29 will raise or lower both of the links 27 since the lever 29a is held on the quadrant 28a which is rigid with the shaft 31. This raising and lowering of the links 27 also raises and lowers the forward ends of the beams 25. When it is desired to adjust one relative to the other, the lever 29a is adjusted on the quadrant 28a.

In order to counterbalance the weight of the burster when being lifted, as will be later described, I provide a counterbalance mechanism which tends to assist the lever 29 to be moved to its rearward position. On the shaft 31, a lever arm 32 is provided, at the outer end of which is connected a link 33 to which in turn is connected a counterbalance spring 34. At the other end of the counterbalance spring 34 is a hook 35 which is screw-threaded at its end and adjustably connected to and through an outwardly extending ear 20a on the bracket plate 20. A similar counterbalance mechanism is mounted on the opposite side.

On the shaft 31 are also mounted a pair of lever arms 35 which have pivotally connected at their outer ends rear-end lifting rods 36. The rods 36 extend rearwardly and are connected for one way operation with the lifting mechanisms which will now be described. As both sides of the lifting mechanism are the same, one description will describe both.

The burster beam 25 at its under side has a long cylindrical bearing 37 which is suitably secured to the beam as by welding. Mounted on an arm 39a of a bell crank lever 39, through pivot pin 39b, is a bearing member 37a having downwardly extending link members 37b rigid therewith. These link members 37b carry a shaft or bolt 37c which passes through the lower ends of the link members 37b and the cylindrical member 37 to pivotally connect these members together. The members 37, 37a, 37b and 37c, form a link ball frame connection between the bell crank arm members 39 and the burster beam 25 whereby the beam may be lifted by the bell crank lever.

With the rigid connection between the bearing member 37a and the link members 37b, any tendency to sidewise movement will be resisted and with the rigid connection between the beam and the bearing member 37 together with the rigid link ball frame 37a, 37b, any tendency to torsional movement will be counteracted. The operating result of this construction is that the movements of the bursters will be confined to planes perpendicular to the axis of rotation of the respective bell cranks 39.

Mounted in bearings as at 38 in Fig. 3, is the bell crank lever 39 having an operating lever 40 rigidly secured thereto. This lever 40 comprises two spaced members between which is a ring 41 having trunnions journaled in the spaced members of the operating lever 40.

The rearwardly extending rod 36 passes through the trunnioned ring and carries a sleeve 42 which is held in place by the two nuts 43. From this construction it will be clear that if the bell crank lever 39 does not force the ring 41 against the sleeve 42, the rod 36, sleeve 42 and nuts 43 may move rearwardly without having any tendency to move the operating lever 40 or the bell crank lever 39. The purpose of this construction will be brought out in the description of the operation as a whole.

On the rear end of each beam 25 is a burster bottom 50 having a pair of slip heels 51 secured thereto and extending rearwardly from the bottom. Secured to the beam at a point above the bottom is a divided pivoted frame 52, having a pivot 53 secured on the beam. At the rear end of each of the two rearwardly extending arms of the frame 52 are provided coverers 54. These coverers 54 are secured to the rearwardly extending arms of the frame 52 by clamps 55.

On the bracket 56, secured to the beam 25, is supported an adjustable spring spindle 57 which carries a spring 58. The spindle 57 passes through a guide 58a upon which presses the spring 58. It is thus clear that the coverers 54 are spring pressed in a downward direction. Between the arms of the bracket 56 and the side members of the frame 52 is a planter boot 59 which is secured rigidly to the beam 25. The boot 59 has its open end located between the slip heels 51 in order to deposit the seed at the bottom of the furrow just prior to the passage of the coverers which cover the seed with earth.

In the top of the boot of each lister there is a flexible seed conduit 64 the upper end of which is connected to the planting device 60 below the hopper 61. A sprocket 62 (see Fig. 3) is driven by a sprocket 63, mounted on the wheel 117, through the chain 63a. There is a planter and hopper and coacting mechanism for each lister. One hopper and planting device has been omitted from Fig. 3 for the sake of clearness. It will be noted that in the preferred embodiment, herein illustrated, the hopper 61 and the planting device 60 are supported on the tractor, the flexible conduit 64 taking care of the connection to the boot, regardless of the height of the burster bottom.

The operation of the invention as a whole is as follows: In broad terms, the burster is provided with means for adjusting the forward end of its beam vertically and exerting a forward pull. When the operative is ready to have the implement enter the ground, he starts his tractor forward and moves the lifting lever 29 from its position in Fig. 1 toward the position of Fig. 2.

The first result of this action is the lowering of the lifting links 27 and the forward ends of the beams 25 and the corresponding lowering of the rear end of the draft bar 23. Simultaneously during the first part of the movement, the lifting rods 36 move rearwardly, lowering the bursters until the points reach the ground. Further movement of the lifting rod 36 rearwardly, moves the sleeves 42 away from the trunnion rings 41 and the rear of the bursters are free for up and down movement. As the tractor moves the bursters forward, the bursters will continue their downward movement until the slip heels 51 rest upon the bottom of the furrow. When the bottom of the burster is parallel to the surface of the ground, the downward movement will cease and we have the true draft condition. If for any reason the height of the forward end of the beam 25 is changed, the burster point will be guided up or down as the case may be until a state of stability is reached. By knowing in what notches the lifting lever and leveling lever dogs have to be placed to produce a predetermined depth of furrows, it is only necessary to lock the lifting and leveling levers at these points to produce the required depth of furrows.

The lifting bail link frames and connecting parts, 37, 37a, 37b and 37c, prevent sidewise and torsional movement and at the same time permit free up and down movement of the burster bottoms.

When it is desired to raise the bursters from the ground, it is not necessary to put any lifting force on the rear portion of the implement. It is only necessary to use the lifting and control lever 29 as a control lever, moving the same backwards to raise the front end of the burster beams 25 by raising the links 27, at the same time moving the lifting rods 36 forward until the sleeves 42 reach the trunnion rings 41 but not far enough to exert lifting pressure on the burster bottoms.

The forward movement of the tractor with the points pointed at an upward incline, brings the burster bottoms out of the earth. If desired, further movement of the lever 29 causes it to function as a lifting lever and both front and rear ends of both bursters are lifted clear of the ground.

In the drawings, I have illustrated a two row lister. It is to be understood that it is not necesary to have the two bursters and that a single burster could be used.

The tractor illustrated is of a type permitting reversal of the wheels and thus making a wide or narrow tread tractor as desired.

While the invention has been illustrated and described somewhat in detail, it is to be understood that the disclosure is merely illustrative and that modifications and changes may be made without departing from the spirit of the invention and within its scope as claimed.

Having described my invention what I claim is:

1. A tractor lister attachment comprising a burster plow member having a forwardly extending beam, vertically swinging adjustable means having its forward end connected adjacent the forward end of the tractor frame for supporting the forward end of the beam and serving as a draft member and being in substantially a straight line to the plow member and means for supporting the rear end of the plow and to raise and lower the rear end of the plow when it is above the ground and controlling means for raising and lowering the front end of the beam, said beam guiding the plow out of or into the ground during forward movement of the tractor and means coacting with the raising and lowering means for releasing the raising and lowering means of the rear end from operation when the plow member is in working position.

2. A tractor lister attachment comprising a burster plow member having a forwardly extending beam, vertically swinging adjustable means having its forward end connected adjacent the forward end of the tractor frame for supporting the forward end of the beam from the tractor at different levels and being in substantially a straight line to the plow member, means for raising and lowering the rear end of the plow member from and above the ground, and means coacting with the forward raising and lowering means for releasing the rear end raising and lowering means from operation when the plow member is in the ground.

3. A tractor lister attachment comprising a burster plow member having a forwardly extending beam, vertically swinging means having its forward end connected adjacent the forward end of the tractor frame for adjustably supporting the front end of the beam and the rear end of the plow member from the tractor, the forward and rear ends of the adjustable supporting means being in a line to the plow member and a single operative-controlled means connected adjacent to and for moving the front end of the plow beam up and down whether the plow is in or above the ground and for exerting a lifting action on the rear portion of the plow member when it is above the ground and releasing the rear supporting means from operation when the plow is in operation in the ground.

4. A tractor lister attachment comprising a burster plow member having a forwardly extending beam, vertically swinging adjustable means having its forward end connected adjacent the forward end of the tractor frame for supporting the forward end of the beam from the tractor and at any one of a plurality of heights, the ends of the adjustable means having a substantially straight line to the plow member means connected to the rear end of the plow member for raising and lowering the rear end when it is above the ground surface and means for releasing the raising and lowering means from operation when the plow member is in plowing position, the raising and lowering means comprising means for confining the movement of the plow member to a single plane when the plow member is in working position and for causing the release of the rear raising and lowering means during the initial lowering movement of the forward end of the beam.

5. A tractor lister attachment comprising a burster plow member having a forwardly extending beam, vertically swinging adjustable means having its forward end connected adjacent the forward end of the tractor frame for supporting the forward end of the beam from the tractor and at any one of a plurality of heights, the ends of the adjustable means having a substantially straight line to the plow member means including a bearing and spaced link members rigid with the bearing, for raising and lowering the rear end of the plow and confining its movement to substantially a single plane when in working position and means for releasing the raising and lowering means from operation when the rear of the plow member is in working position whereby the rear end of the plow will seek a predetermined level as controlled by the height of the forward end of the beam.

6. A tractor lister attachment comprising a burster plow member having a forwardly extending beam, vertically swinging adjustable means having its forward end connected adjacent the forward end of the tractor frame for supporting the forward end of the beam from the tractor and at different levels, the ends of the adjustable means having a substantially straight line to the plow member means for raising and lowering the rear end of the plow member from and above the ground, a hand lever connected to the front supporting means for controlling its height and an elongated member connecting the front supporting means with the rear raising and lowering means and having a connection which is released from operation while the forward supporting means is below a predetermined level.

7. A tractor lister attachment comprising a draft bar, means for securing the forward end of the draft bar to the forward end of a tractor, means for adjustably controlling the height of the rear portion of the draft bar and a burster plow member pivotally connected to the rearward portion of the draft bar intermediate the ends of the tractor for free up and down movement when plowing the adjustably controlling means including means for releasing the rear portion of the plow for free up and down movement on the initial movement toward operative position.

8. A tractor lister attachment comprising a draft bar, means for pivotally securing the forward end of the draft bar to the forward end of a tractor, means for adjustably controlling the height of the rear portion of the draft bar, a burster plow member pivotally connected to the rearward portion of the draft bar and means coacting with the adjustably controlling means and operative when the plow is above the ground to lift its rear end off the ground and operatively disconnected to affect the depth of the plow when it is in the ground, the draft bar and plow member being pivoted together intermediate the front and rear tractor wheels.

9. A tractor lister attachment comprising a draft bar, means for pivotally securing the forward end of the draft bar to the forward end of a tractor, means for adjustably controlling the height of the rear portion of the draft bar and a burster plow member pivotally connected to the rearward portion of the draft bar for free up and down movement when plowing, the depth of entry in the ground of the rear portion of the plow member being controlled by the height of the forward end of the plow beam, the draft bar and plow member being pivoted together intermediate the front and rear tractor wheels.

10. A tractor lister attachment comprising a draft bar, means for pivotally connecting the forward end of the draft bar to a tractor, means for adjustably controlling the height of the rear portion of the draft bar and a burster plow member pivotally connected to the rearward portion of the draft bar for free up and down movement in a plane normal to the axis of the draft bar pivotal connecting means, the adjustably controlling means including a means for freeing the plow member for said up and down movement during the initial movement toward operative position.

11. A tractor lister attachment comprising a draft bar, means for pivotally securing the forward end of the draft bar to a tractor, means for adjustably controlling the height of the rear portion of the draft bar, a burster plow member pivotally connected to the rearward portion of the draft bar, the ends of the draft bar being in a line to the plow member and means including and under control of a single manually movable means to guide the forward end to bring the plow member out of the ground under forward movement and a lost motion connection which operatively connects the single manually movable means to the rear height-controlling means, as the plow member leaves the ground, for lifting the plow member to a position above the ground.

12. A tractor lister attachment comprising a plow member having a forwardly extending beam, a draft bar extending forwardly from the forward end of the beam and being pivotally connected thereto, the forward end of the draft bar having means for pivotal connection to a tractor, a manually operated height-controlling means for raising and lowering the pivotal connection between the draft bar and beam, the draft bar and plow member being pivoted together intermediate the front and rear traction wheels, means for raising and lowering the rear end of the plow, an elongated means for connecting the manually controlled means with the rear raising and lowering means including a lost motion device, for releasing the elongated means from operating when the front end of the plow beam is not higher than a predetermined level.

13. A tractor lister attachment comprising a pair of burster plow members, each having a forwardly extending beam connected to the forward end of the tractor, separate means for adjustably supporting and holding in place the forward ends of the respective beams, the ends of the separate means being located substantially in respective straight lines which pass from front to rear through the respective plow members, means for separately supporting the rear ends of the respective plow members and a connection between the forward and rear supporting means of the respective plow members for releasing operative control of the rear from the forward supporting means when the latter are lower than a predetermined level and for operatively connecting the two together for simultaneous lifting of the two plow ends when the rear of the plow is out of the ground and a single control means for lifting both plow members bodily and at the same time when above the ground surface.

14. A tractor lister attachment comprising a pair of burster plow members, each having a forwardly extending beam connected to the forward end of the tractor, separate means for adjustably supporting and holding in place the forward ends of the respective beams, the ends of the separate means being located substantially in respective straight lines which pass from front to rear through the respective plow members, means for separately supporting the rear ends of the respective plow members and a connection between the forward and rear supporting means of the respective plow members for releasing operative control of the rear from the forward supporting means when the latter are lower than a predetermined level and for operatively connecting the two together for simultaneous lifting of the two plow ends when the rear of the plow is out of the ground, adjustable connections between the separate means whereby relative height adjustment may be given the two forward beam ends and a single means for adjusting the two together while maintaining the relative adjustment.

15. A tractor lister attachment comprising a pair of burster plow members, each having a forwardly extending beam connected to the forward end of the tractor, separate means for adjustably supporting and holding in place the forward ends of the respective beams, the ends of the separate means being located substantially in respective straight lines which pass from front to rear through the respective plow members, means for separately supporting the rear ends of the respective plow members and a connection between the forward and rear supporting means of the respective plow members for releasing operative control of the rear from the forward supporting means when the latter are lower than a predetermined level and for connecting the two together for simultaneous lifting of the two plows ends when the rear of the plow is out of the ground, adjustable connections between the separate means whereby relative height adjustment may be given the two forward beam ends and a single means for adjusting the two together while maintaining the relative adjustment, and for bodily lifting both plow members, when they are above the ground, to an elevated position for transport.

16. A tractor lister attachment comprising a burster plow member having a forwardly extending beam, a draft bar pivoted at its forward end to the tractor and extending rearwardly at an angle to the horizontal and being pivoted at its rear end to the forward end of the beam the ends of the draft bar being in a line to the plow member, a frame pivotally mounted on the tractor having spaced link members for supporting the rear of the plow member, the axis of the pivoted frame being substantially in a horizontal plane to permit free movement of the plow member in a vertical plane and prevent torsional movement of the plow relative to the tractor.

CHARLES T. RAY.